Patented Aug. 22, 1933

1,923,569

UNITED STATES PATENT OFFICE 1,923,569

PRODUCTION OF DIOLEFINES

Martin Mueller-Cunradi, Ludwigshafen-on-the-Rhine, and Ernst Ober, Mannheim, Germany, assignors to I. G. Farbenindustrie Aktiengesellschaft, Frankfort-on-the-Main, Germany No Drawing. Application June 17, 1930, Serial No. 461,841, and in Germany July 22, 1929

6 Claims. (Cl. 260—171)

This invention relates to improvements in the manufacture and production of diolefines.

We have found that butadiene or the other corresponding diolefines are obtained in an advantageous manner from 1.3-butylene glycol or other 1.3-dihydroxy compounds such as 2-methyl-1.3-butylene glycol or 2.3-dimethyl-2.3-butanediol by leading the dihydroxy compounds over catalysts which favor the splitting off of water at elevated pressures preferably of from about 2 to 20 atmospheres, preferably at a pressure of about 10 atmospheres, and at elevated temperatures of from about 250° to 400° centigrade, preferably at temperatures of from about 270° to 300° centigrade. As the catalysts may be mentioned for example phosphoric acid, red phosphorus, sodium phosphate, potash alum, aluminium oxide activated with a little copper sulphate, aluminium phosphate, thorium oxide and the like, or mixtures of these, if desired precipitated onto carriers. The employment of the said elevated pressure has the great advantage that a greatly increased throughput was obtained, surprisingly without any substantial decrease in percentage yield, that is to say a much larger amount of diolefines is obtained for a given reaction space. Too high pressures may, however, cause a decrease in yield.

The following examples will further illustrate the nature of this invention, but the invention is not restricted to these examples.

Example 1

A mixture of 1.3-butylene glycol and the same amount by weight of water in the vapor phase is led at a temperature of about 300° centigrade and a pressure of about 10 atmospheres over a catalyst prepared by careful dehydration from monosodium phosphate with the addition of red phosphorus. The throughput is four times as great as at ordinary pressure. The yields of crude butadiene, similarly to those obtainable at ordinary pressure, are from about 70 to 80 per cent.

Example 2

The mixture described in Example 1 is led under the conditions therein specified over a catalyst of silica gel which has been impregnated with monosodium phosphate and a very small amount of phosphoric acid. The ratio of the throughput thus obtained to the throughput at ordinary pressures is 5:3. The yield of crude butadiene, similarly to that obtainable at ordinary pressure, is from about 65 to 70 per cent.

Example 3

The mixture described in Example 1 is led under the conditions therein specified over a catalyst prepared by impregnating granular pumice stone with phosphoric acid. The ratio of the throughput thus obtainable to the throughput at ordinary pressure is 5:2. The yield of crude butadiene obtained is, as at ordinary pressure, from about 55 to 60 per cent.

Example 4

A mixture of 2-methyl-1.3-butylene glycol and water vapor is passed over the catalyst described in Example 2, under the same conditions as those described in Example 1. The throughput per unit of space in the reaction vessel and per unit of time is twice that, which is attained under atmospheric pressure, and the percentage yield is the same, namely about 60 to 65 per cent.

What we claim is:—

1. A process for the production of a diolefine, which comprises passing a 1.3-butylene glycol at a pressure of about 2 to 20 atmospheres and at a temperature of about 250° to 400° centigrade over a dehydration catalyst.

2. A process for the production of a diolefine, which comprises passing a 1.3-butylene glycol at a pressure of about 2 to 20 atmospheres and at a temperature of about 270° to 300° C. over a dehydration catalyst.

3. A process for the production of a diolefine, which comprises passing a 1.3-butylene glycol with added water vapor at a pressure of about 2 to 20 atmospheres and at a temperature of about 250° to 400° C. over a dehydration catalyst.

4. A process for the production of butadiene, which comprises passing 1.3-butylene glycol in admixture with the same amount of water vapor at a temperature of about 300° centigrade and at a pressure of about 10 atmospheres over a catalyst prepared by dehydration of monosodium phosphate.

5. A process for the production of a diolefine, which comprises passing a 1.3-butylene glycol at a pressure of about 10 to 20 atmospheres and at a temperature of about 250° to 400° C. over a dehydration catalyst.

6. A process for the production of a diolefine, which comprises passing a 1.3-butylene glycol at a pressure of about 10 to 20 atmospheres and at a temperature of about 270° to 300° C. over a dehydration catalyst.

MARTIN MUELLER-CUNRADI.
ERNST OBER.